United States Patent [19]

Larue et al.

[11] Patent Number: 4,701,664

[45] Date of Patent: Oct. 20, 1987

[54] MERCURY ARC LAMP SUITABLE FOR INCLUSION IN A FLOW CYTOMETRY APPARATUS

[75] Inventors: Roderick W. Larue, Oakland, Calif.; Werner Aebersold, Buonas, Switzerland; Robert Eckel, Santa Clara, Calif.

[73] Assignee: Becton, Dickinson and Company, Franklin Lakes, N.J.

[21] Appl. No.: 817,326

[22] Filed: Jan. 9, 1986

[51] Int. Cl.⁴ ...................... H01J 61/35; G01N 21/64

[52] U.S. Cl. .................................... 313/112; 313/114; 313/635; 250/461.2

[58] Field of Search ............... 313/112, 114, 489, 570, 313/571, 573, 632, 635, 639; 250/461.2

[56] References Cited

U.S. PATENT DOCUMENTS

| | | | |
|---|---|---|---|
| 2,707,247 | 4/1955 | Anderson, Jr. | 313/114 X |
| 3,504,819 | 4/1970 | Veres | 313/635 X |
| 3,593,056 | 7/1971 | Degawa | 313/634 |
| 3,826,364 | 7/1974 | Bonner et al. | 203/3 |
| 4,156,826 | 5/1979 | Hernquist | 313/221 |
| 4,275,327 | 6/1981 | Walsh | 313/112 X |
| 4,284,412 | 8/1981 | Hansen et al. | 23/230 B |
| 4,295,074 | 10/1981 | Raglan, Jr. | 313/174 |
| 4,348,107 | 9/1982 | Leif | 356/72 |
| 4,467,238 | 8/1984 | Silverstein | 313/635 X |
| 4,600,302 | 7/1986 | Sage, Jr. | 250/461.2 X |

*Primary Examiner*—Leo H. Boudreau
*Assistant Examiner*—Sandra L. O'Shea
*Attorney, Agent, or Firm*—Richard J. Rodrick

[57] ABSTRACT

A mercury arc lamp comprises a glass envelope including a center portion. A cathode and an anode are sealed within the envelope. The internal ends of the cathode and the anode lie in close proximity to each other within the center portion of the envelope. Electrically conductive positive and negative contacts are connected to the anode and the cathode, respectively. The interior of the envelope contains mercury and cadmium to be vaporized during operation of the lamp. A pair of reflective coatings is around the envelope. Each coating is located near an internal end of the cathode and the anode, respectively, with a space between the coatings so that the arc between the cathode and the anode is adapted to emit radiation through the space. A flow cytometry apparatus which uses a mercury arc lamp such as described above, is also within the purview of the present invention.

11 Claims, 2 Drawing Figures

MERCURY ARC LAMP SUITABLE FOR INCLUSION IN A FLOW CYTOMETRY APPARATUS

BACKGROUND OF THE INVENTION

1. Field of the Invention

The present invention relates to a doped mercury arc lamp, and also concerns various instruments, such as a flow cytometry apparatus, which utilize such a mercury arc lamp for operation.

2. Description of the Prior Art

Mercury arc lamps are used for optical instrumentation, photochemistry, spectroscopy, and various applications requiring high intensity ultraviolet and other wavelength radiation. The point source configuration of the arc renders the mercury arc lamp most suitable for the aforementioned applications. One specific field in which mercury arc lamps are utilized is flow cytometry. In a typical flow cytometry apparatus, cells, particles or other biological elements are caused to flow, in a liquid stream, single file past a beam of light. This beam of light intersects the flowing liquid stream containing the cells at a right angle (nominal). Light scattered by the particles passing through the light beam may be detected at different angles with respect to the axis of the beam of light. Various characteristics of these cells may be determined in conjunction with the detection of scattered light. Further, the cells may be inherently fluorescent or may be labeled with a fluorescent marker. As these fluorescent cells pass through the light at a stimulating frequency, the fluorescent cells are energized and emit fluorescence which may be detected with respect to each cell so energized. A mercury arc lamp is a desirable light source for providing the beam of light for such flow cytometry apparatuses. Representative flow cytometry apparatuses are described in U.S. Pat. Nos. 3,826,364; 4,284,412; and 4,348,107.

One of the problems experienced with mercury arc lamps used in optical instrumentation is the short operative life span. Life span of mercury arc lamps, as well as many other light sources, may be defined as the time it takes for the power output to fall below a certain level. For example, a mercury arc lamp rated at 100 watts may be said to have outlived its usefulness if, after 100 hours, its output has fallen below a certain level. It is then said to have a life rating of 100 hours. In flow cytometers, this minimum level is closely related to the number of dye molecules contained on a cell which need to be detected.

Presently known and available mercury arc lamps, suitable for optical instrumentation uses, have a reliable life rating of about 100 hours. This is a typical life rating for a 100 watt mercury arc lamp which emits radiation between 225 and 650 nanometers (nm). Across this spectrum of frequencies, the mercury arc lamp has strong lines or emission properties at a number of different wavelengths. For example, there may be strong lines at approximately 365, 436 and 546 nanometers. Of course, these numbers are merely exemplary and are not intended to limit the lines of a mercury arc lamp in any way.

A known mercury arc lamp, available from Advanced Radiation Corporation, Santa Clara, Calif., has sought to improve the life rating of the lamp. This known arc lamp includes a metallic reflective coating, usually gold-based, around the center portion of the glass envelope. The coating is positioned so as to substantially cover the cathode. It is understood that the reflective coating causes an increase in the lamp temperature so that the mercury contained within should vaporize properly and both increase arc stability and extend lamp life. However, a life rating of 100 hours is still a typical value for the mercury arc lamp with the single reflective coating. Representative mercury arc lamps are described in U.S. Pat. Nos. 3,593,056; 4,156,826; and 4,295,074.

There is, therefore, still a need for mercury arc lamps, useful for optical instrumentation, which have improved life ratings without compromising the power output particularly at the wavelengths of interest.

SUMMARY OF THE INVENTION

The mercury arc lamp of the present invention comprises a glass envelope including a center portion. A cathode and an anode are sealed within the envelope. The internal ends of the cathode and the anode lie in close proximity to each other within the center portion of the envelope. An electrically conductive positive contact and a negative contact are connected to the anode and the cathode, respectively. The interior of the envelope contains mercury and cadmium to be vaporized during operation of the lamp. A pair of reflective coatings is around the envelope. Each coating is located near an internal end of the cathode and the anode, respectively, with a space between the coatings so that the arc between the cathode and the anode is allowed to emit radiation between the coatings.

In another aspect of the present invention, the mercury arc lamp substantially as described above is included in a flow cytometry apparatus for determining one or more characteristics of particles or the like flowing in a liquid stream. This apparatus includes means for moving particles, substantially one at a time in a liquid flow stream. The mercury arc lamp, such as described above, provides a beam of light directed toward the particles moving in the stream. Means are provided for detecting light associated with respect to each moving particle and for associating the detected light with one or more characteristics of each particle.

In accordance with the principles of the present invention, the mercury arc lamp provides a number of significant advantages over presently known and available arc lamps. Specifically, the present mercury arc lamp has an extended life rating substantially greater than those lamps available today. For example, due to the features of the present invention, the life rating of the new mercury arc lamp is expected to be about 250 hours of continuous operation and may extend, on a reasonably reliable basis over 400 hours. Moreover, the mercury arc lamp of the present invention provides significantly higher emission at certain wavelengths within the frequency spectrum that it operates. For example, in the 485 nm region, output of the instant mercury arc lamp is approximately fifty percent higher than the known and available mercury arc lamps. Accordingly, with a longer life rating, as well as increased output at wavelengths of interest, the mercury arc lamps would not have to be replaced as frequently as must now be done. This, in turn, means less maintenance, labor, inventory of parts, storage and the like, so that expense of operation should be considerably reduced.

DETAILED DESCRIPTION

Figure 1:
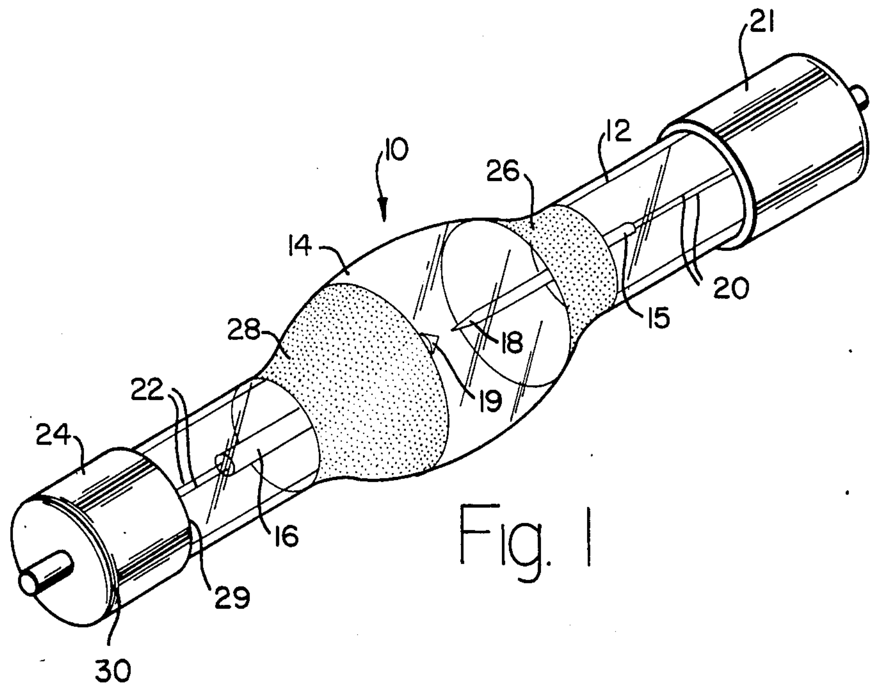
FIG. 1 is a perspective view of the preferred mercury arc lamp of the present invention.
Figure 2:
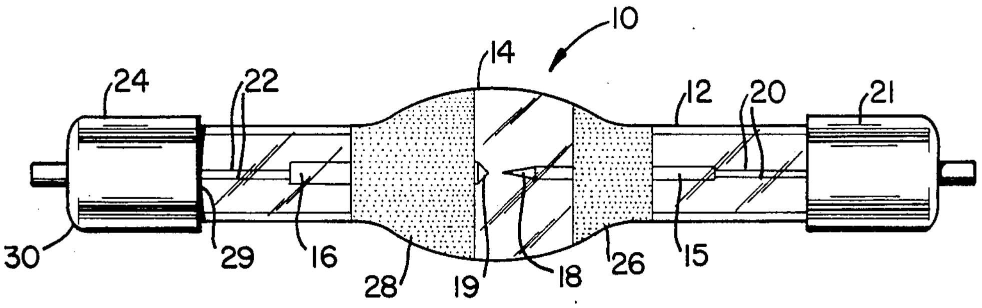
FIG. 2 is a side elevational view of the mercury arc lamp of FIG. 1.

While this invention is satisfied by embodiments in many different forms, there is shown in the drawings and will herein be described in detail a preferred embodiment of the invention, with the understanding that the present disclosure is to be considered as exemplary of the principles of the invention and is not intended to limit the invention to the embodiment illustrated. The scope of the invention will be measured by the appended claims and their equivalents.

Adverting now to the drawings, there is illustrated the preferred mercury arc lamp 10 of the present invention. Comprising arc lamp 10 is an elongate glass envelope 12 which is preferably cylindrical in nature. Optically clear glass is normally used for this envelope, with quartz being preferred. It can be seen in the drawings that center portion 14 of the envelope has a bulbous structure. This structure facilitates the emission or radiation from the lamp because of the point source configuration of the arc produced inside the lamp during operation.

Sealed inside the cavity formed by envelope 12 is a cathode 15 and an anode 16, arranged axially within the envelope. Both the cathode and the anode are sealed within the envelope in a substantially oxygen-free environment as is customary and well-known in electrical lighting devices. It can be seen in the drawings that the internal end 18 of the cathode and the internal end 19 of the anode lie in close proximity to each other within bulbous center portion 14. The spacing between ends 18 and 19 of the cathode and anode, respectively, is chosen so as to provide a consistent short arc across the gap when an electric current is passed through the lamp.

Extending from cathode 15 are lead wires 20 interconnecting the cathode with an electrically conductive negative contact 21 on one end of the envelope. Similarly, electrical lead wires 22 extend from anode 16 so as to interconnect the anode with an electrically conductive positive contact 24 on the other end of the envelope. Electrically conductive contacts 21 and 24 are adapted to make contact with an outside source for providing an electric current to the cathode and the anode.

In the mercury arc lamp, a small amount of mercury is sealed within the envelope, typically in small pools in a chamber surrounding the cathode and the anode, such as described in U.S. Pat. No. 4,156,826. Once the electric current is passed through the lamp, the mercury becomes an ionized vapor and gives off ultraviolet and longer radiation. Thus, the discharge takes place through the mercury vapor. In the present invention, the mercury arc lamp includes a sufficient amount of mercury to become vaporized to provide the discharge when the electric current is applied to the cathode and the anode. In addition to the mercury, a small but sufficient amount of cadmium is also sealed inside the envelope near the cathode and the anode. Both the cadmium and mercury, sometimes referred to as doping materials which may be selected for specific spectral output, become vaporized when an electric current is applied to the cathode and the anode. Therefore, the electrical discharge takes place through the mercury and cadmium vapor. Cadmium has been added as a doping material so as to increase the output of the instant arc lamp in the wavelength region between about 475 to 495 nanometers. At these emission lines, the combination of cadmium and mercury as doping material provides an output fifty percent greater than arc lamps using only mercury (at least those lamps having a 100 watt power rating).

The doping materials, herein being a combination of mercury and cadmium, when vaporized increase the pressure within envelope 12 to levels far exceeding normal atmospheric pressure. It is expected that the vaporized doping materials within the envelope will cause pressures substantially greater than ten atmospheres. An inert gas, such as argon, xenon and the like, may be included in the sealed envelope to improve efficiency of operation and extend its useful life span.

Included on envelope 12 are two reflective coatings 26 and 28. These coatings are preferably metallic-based substances coated on the exterior surface of envelope 12. For example, coatings 26 and 28 may be thin platings of gold, silver, platinum or the like, with gold being the most preferable. It can be seen in the drawings that coatings 26 and 28 are located around envelope 12 and extend slightly onto bulbous section 14. Thus, each reflective coating surrounds or covers a portion of cathode 15 and anode 16, respectively. While coatings 26 and 28 are located near ends 18 and 19 of the cathode and anode, respectively, a space exists between the coatings at bulbous portion 14 so that internal ends 18 and 19 are not blocked. The unblocked bulbous portion is coated with a dielectric, such as indium-tin oxide, that transmits the desired visible wavelengths, and reflects wavelengths longer than 650 nm back into the bulb. When an electric current is passed through the lamp, the arc which occurs across the gap between ends 18 and 19 emits radiation of various wavelengths through the space between reflective coatings 26 and 28.

While it was known to include one reflective coating around the envelope of the arc lamp, the utilization of two such reflective coatings is believed to be a departure from the known arc lamps. The second such reflective coating and the central dielectric coating are included on the present invention so as to increase the lamp temperature so that the second doping element, cadmium, will properly vaporize for an efficient electrical discharge. The additional lower coating 28 increases the lamp internal temperature causing the cadmium to partially vaporize. A dielectric coating on the central bulb 14 causes reflection of wavelengths above 650 nm and allows passage of the desired emissions at lower wavelengths. This dielectric coating further enhances the vaporization of the cadmium. Damage to the heat sensitive hermetic seal boundary from higher temperatures is avoided by: (1) extending the length of the lamp so the hermetic seal boundary 29 is at least 1.6 inches from the anode tip 19 rather than the standard 1.3 inches; and (2) including a radius on the anode base for enhanced thermal conductivity to the lamp socket 30.

The mercury arc lamp of the instant invention is particularly useful as a light source in a flow cytometry apparatus such as described above and explained in more detail in the above-listed patents. When used in a flow cytometry apparatus, as well as other suitable applications such as fluorescent microscopes, replacement of the mercury arc lamp as described herein is required much less frequently with the attendant savings in cost, labor and maintenance.

Thus, the present invention provides a long-life mercury arc lamp with extended lamp life and increased output along certain emission lines.

What is claimed is:

1. A mercury arc lamp comprising: a glass envelope including a center portion; a cathode and an anode sealed within said envelope, the internal ends of said cathode and said anode lying in close proximity to each other within said center portion of the envelope;

an electrically conductive positive contact connected to said anode;

an electrically conductive negative contact connected to said cathode;

the interior of said envelope containing mercury and cadmium near said cathode and said anode; and a pair of metallic-based reflective coatings around said envelope, each coating located near an internal end of the cathode and the anode, respectively, with a space between said metallic-based coatings, said space having a reflective dielectric coating thereon so that the arc between the cathode and the anode is adapted to emit ultraviolet and visible radiation through said reflective dielectric coating, but wherein said dielectric coating is adapted to reflect infrared wavelengths into the interior of said envelope.

2. The lamp of claim 1 wherein the center portion of said envelope has a bulbous configuration.

3. The lamp of claim 1 wherein there is an inert gas sealed within said envelope.

4. The lamp of claim 1 wherein said coatings are on the outside surface of said envelope.

5. The lamp of claim 1 wherein said coatings include gold.

6. The lamp of claim 1 which further includes a hermetic seal region between said positive contact and the internal end of the anode.

7. The lamp of claim 1 wherein said reflective dielectric coating is made of indium-tin oxide reflects infrared wavelengths longer than 650 nm into the interior of said envelope.

8. The lamp of claim 1 wherein said envelope is made of quartz.

9. A mercury arc lamp comprising:

a glass envelope including a center portion; a cathode and an anode sealed within said envelope, the internal ends of said cathode and said anode lying in close proximity to each other within said center portion of the envelope;

an electrically conductive positive contact connected to said anode;

an electrically conductive negative contact connected to said cathode;

the interior of said envelope containing mercury near said cathode and said anode; and a pair of metallic-based reflective coatings around said envelope, each coating located near an internal end of the cathode and the anode, respectively, with a space between said metallic-based coatings, said space having a reflective dielectric coating thereon so that the arc between the cathode and the anode is adapted to emit ultraviolet and visible radiation through said reflective dielectric coating, but wherein said dielectric coating is adapted to reflect infrared wavelengths into the interior of said envelope.

10. A long-life, high pressure mercury arc lamp comprising:

a substantially cylindrical quartz envelope having a bulbous center portion;

a cathode and an anode sealed within said envelope, the internal ends of said cathode and said anode lying in close proximity to each other within said bulbous center portion of the envelope, the interior of said envelope including sufficient amounts of mercury and cadmium to be vaporized when an electric current is applied to the cathode and the anode;

an electrically conductive positive contact at one end of the envelope connected to said anode;

an electrically conductive negative contact at the other end of the envelope connected to said cathode, said contacts adapted to make contact with an outside source for providing an electric current to said cathode and said anode; and a pair of gold-based, reflective coatings around the exterior surface of said envelope, each coating located near an internal end of the cathode and the anode, respectively, with a space between said gold-based coatings, said space having a reflective dielectric coating thereon so that the arc between the anode and the cathode is adapted to emit ultraviolet radiation through said reflective dielectric coating, but wherein said reflective dielectric coating is adapted to reflect infrared wavelengths into the interior of said envelope.

11. A flow cytometry apparatus for determining one or more characteristics of particles or the like flowing in a liquid stream comprising;

means for moving particles, substantially one at a time in a liquid flow stream;

a mercury arc lamp for providing a beam of light directed toward said particles moving in said stream;

means for detecting light associated with respect to each moving particle and for associating said detected light with one or more characteristics of each particle, wherein said mercury arc lamp is characterized by a glass envelope including a center portion; a cathode and an anode sealed within said envelope, the internal ends of said cathode and said anode lying in close proximity to each other within said center portion of the envelope, an electrically conductive positive contact connected to said anode; an electrically conductive negative contact connected to said cathode; the interior of said envelope containing mercury and cadmium near said cathode and said anode; and a pair of metallic-based reflective coatings around said envelope, each coating located near an internal end of the cathode and the anode, respectively, with a space between said metallic-based coatings, said space having a reflective dielectric coating thereon so that the arc between the cathode and the anode is adapted to emit ultraviolet and visible radiation through said reflective dielectric coating directed toward said particles moving in said stream, but wherein said reflective dielectric coating is adapted to reflect infrared wavelengths into the interior of said envelope.

* * * * *